US012646145B2

(12) United States Patent
Lough, Jr. et al.

(10) Patent No.: US 12,646,145 B2
(45) Date of Patent: Jun. 2, 2026

(54) METHODS FOR FORMING COMPOSITE FACE IMAGES

(71) Applicant: Generations Studio, LLC, Post Falls, ID (US)

(72) Inventors: Rodney Lough, Jr., Teonia, ID (US); Ryan Farrell, Provo, UT (US); David K Pederson, Mulino, OR (US)

( * ) Notice: Subject to any disclaimer, the term of this patent is extended or adjusted under 35 U.S.C. 154(b) by 136 days.

(21) Appl. No.: 18/421,797

(22) Filed: Jan. 24, 2024

(65) Prior Publication Data

US 2024/0249390 A1 Jul. 25, 2024

Related U.S. Application Data

(60) Provisional application No. 63/440,758, filed on Jan. 24, 2023.

(51) Int. Cl.
| | |
|---|---|
| *G06T 5/50* | (2006.01) |
| *G06T 3/18* | (2024.01) |
| *G06T 7/50* | (2017.01) |
| *G06T 7/68* | (2017.01) |
| *G06V 10/24* | (2022.01) |
| *G06V 40/16* | (2022.01) |

(52) U.S. Cl.
CPC .................. *G06T 5/50* (2013.01); *G06T 3/18* (2024.01); *G06T 7/50* (2017.01); *G06T 7/68* (2017.01); *G06V 10/242* (2022.01); *G06V 10/245* (2022.01); *G06V 40/171* (2022.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 8,473,981 B1 * | 6/2013 | Gargi | .................... | G06F 16/783 |
| | | | | 725/40 |
| 8,693,789 B1 * | 4/2014 | Seitz | ......................... | G06T 7/33 |
| | | | | 382/209 |
| 2003/0007695 A1 * | 1/2003 | Bossut | ...................... | G06T 9/00 |
| | | | | 382/239 |
| 2004/0056857 A1 * | 3/2004 | Zhang | ...................... | G06T 13/40 |
| | | | | 345/419 |
| 2007/0031062 A1 * | 2/2007 | Pal | ........................ | H04N 23/698 |
| | | | | 382/284 |
| 2008/0170803 A1 * | 7/2008 | Forutanpour | ........ | H04N 1/3876 |
| | | | | 382/284 |

(Continued)

*Primary Examiner* — Jason A Pringle-Parker
(74) *Attorney, Agent, or Firm* — Mohr Intellectual Property Law Solutions, PC

(57) ABSTRACT

Methods for forming a composite face image including receiving into a memory unit a first image file including a first face image, receiving into the memory unit a second image file including a second face image, globally aligning orientations and sizes of the first face image and the second face image, locally aligning the first face image with the second face image, creating a composite image file having a virtual canvas for depicting the composite face image, inserting a left half of the first face image on a left side of the virtual canvas, and inserting a right half of the second face image on the right side of the virtual canvas adjacent to and aligned with the left half of the first face image about a seam between the left half of the first face image and the right half of the second face image.

18 Claims, 10 Drawing Sheets

(56)  References Cited

U.S. PATENT DOCUMENTS

| | | | |
|---|---|---|---|
| 2010/0149362 A1* | 6/2010 | Kang | H04N 5/262 |
| | | | 348/222.1 |
| 2012/0154684 A1* | 6/2012 | Luo | H04N 5/14 |
| | | | 348/700 |
| 2012/0182315 A1* | 7/2012 | Garzo | G06T 11/60 |
| | | | 345/635 |
| 2013/0243270 A1* | 9/2013 | Kamhi | H04N 21/458 |
| | | | 382/118 |
| 2017/0243384 A1* | 8/2017 | Huang | G06T 3/4038 |
| 2020/0020075 A1* | 1/2020 | Khwaja | G06T 5/70 |

* cited by examiner

191A

192A

193A

191B

192B

193B

100

120

121

ROTATING THE IMAGES INTO VERTICAL ORIENTATIONS

122

ADJUST THE SIZE OF THE IMAGES TO BE EQUAL

130

230

231

IDENTIFY FACIAL LANDMARKS IN
THE FACE IMAGES

232

SELECT A TARGET FEATURE FROM
THE FACE IMAGES

233

TRANSFORM AN IMAGE TO MATCH THE
TARGET FEATURE WITH A GENERATIVE
ADVERSARIAL TECHNIQUE

CONVEXLY COMBINING PIXELS
FROM THE IMAGES IN A BLENDING
BAND OVERLYING THE SEAM

METHODS FOR FORMING COMPOSITE FACE IMAGES

CROSS REFERENCE TO RELATED APPLICATIONS

This application claims priority to U.S. Application Ser. No. 63/440,758, filed on Jan. 24, 2023, which is hereby incorporated by reference for all purposes.

BACKGROUND

The present disclosure relates generally to image processing methods. In particular, methods of forming composite face images are described.

For generations, people have collected and preserved photos of their forebears. Before revolutions of digital photography and cloud storage, such photos would be found in family albums and in framed portraits hung on the wall. Many people, if not most, take a keen interest in their kin and in images of their kin.

A growing problem in society is that youth are increasingly disconnected from earlier generations. Images of earlier generations can help build connections for younger generations. Static images of older generations, while helpful to build connections, can only go so far. It would be desirable to have more compelling images to create even stronger intergenerational connections than currently exist today.

With the digital revolution comes the ability to gather and centralize family photos online and to share them with family across the globe. Further, digital image technology has enabled techniques for building novel image compositions based on existing photos. One type of novel image composition existing currently is known as inter-generational or longitudinal portraits. In inter-generational portraits, two faces are merged together, the left half of one face with the right half of the other face, to create a composite face portrait.

Composite face portraits help individuals and families, especially younger individuals, to build and strengthen connections with their relatives. Stronger familial connections function to elevate society as a whole. We all need heroes and inter-generational composite face images help bind those of a given generation with those that have come before.

Known methods for creating composite face portraits are not entirely satisfactory. For example, conventional methods rely on manual techniques. The manual techniques are time consuming, tedious, and not well suited to laypeople. As a result of the existing limitations with conventional manual techniques, composite face portraits are not widely available and not convenient to create.

It would be desirable to have an automated process for creating inter-generational or longitudinal composite face images. An automated process for creating composite face images would reduce the time and cost necessary to create them. Further, composite face images could become more widely available. For example, an automated process could enable laypeople to create composite face images on their own, such as via a webpage or a software application.

Thus, there exists a need for composite face image creation methods that improve upon and advance the design of known methods. Examples of new and useful methods for forming composite face images addressing existing needs are discussed below.

DETAILED DESCRIPTION

Figure 1:
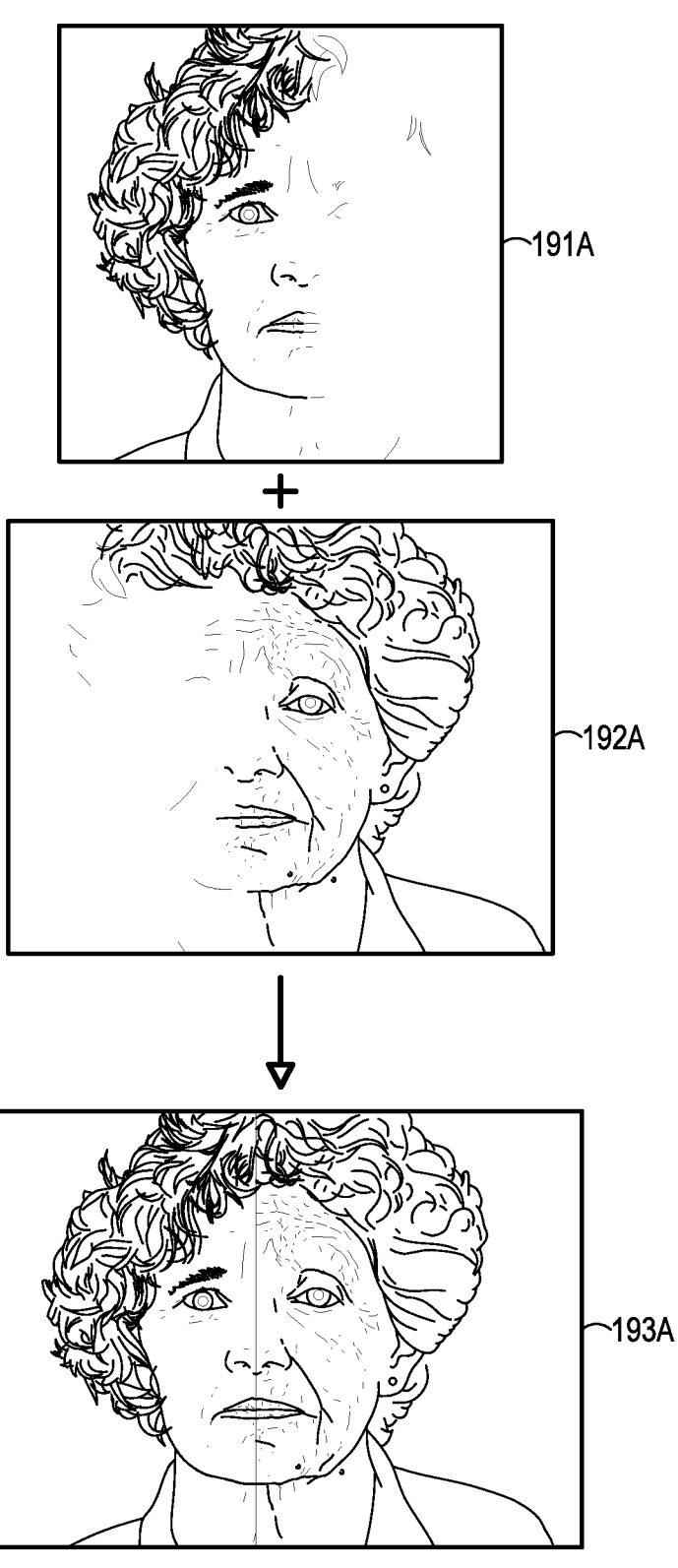
FIG. 1 is a schematic view of a composite face image being created from face images of two different individuals.

The disclosed methods will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, a variety of method examples are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional elements or method steps not expressly recited.

Terms such as "first", "second", and "third" are used to distinguish or identify various members of a group, or the like, and are not intended to denote a serial, chronological, or numerical limitation.

Methods for Forming Composite Face Images

With reference to the figures, methods for forming composite face images will now be described. The methods discussed herein function to combine images of two faces into a single composite face image.

The reader will appreciate from the figures and description below that the presently disclosed methods address many of the shortcomings of conventional methods. For example, the novel methods described herein are automated instead of relying on manual techniques like conventional methods, which are time consuming, tedious, and not well suited to laypeople. The novel, automated methods described in this document reduce the time and cost necessary to create composite face images compared to conventional manual techniques.

Further, the novel methods discussed below enable composite face images to be more widely available to people interested in having them. Additionally, the novel methods described herein enable laypeople to create composite face images on their own. For example, the novel methods discussed in this document may be utilized on a webpage or a software application with an easy to follow user interface.

Contextual Details

Ancillary features relevant to the methods described herein will first be described to provide context and to aid the discussion of the novel methods.

Composite Face Image

The methods disclosed herein are used to form composite face images. An example of a composite face image along with single face images of two different people is depicted in FIG. 1. The reader can see in FIG. 1 that two single face images 191A and 192A of different people are combined to yield a composite face image 193A with a nearly imperceptible seam between the two faces.

Figure 2:
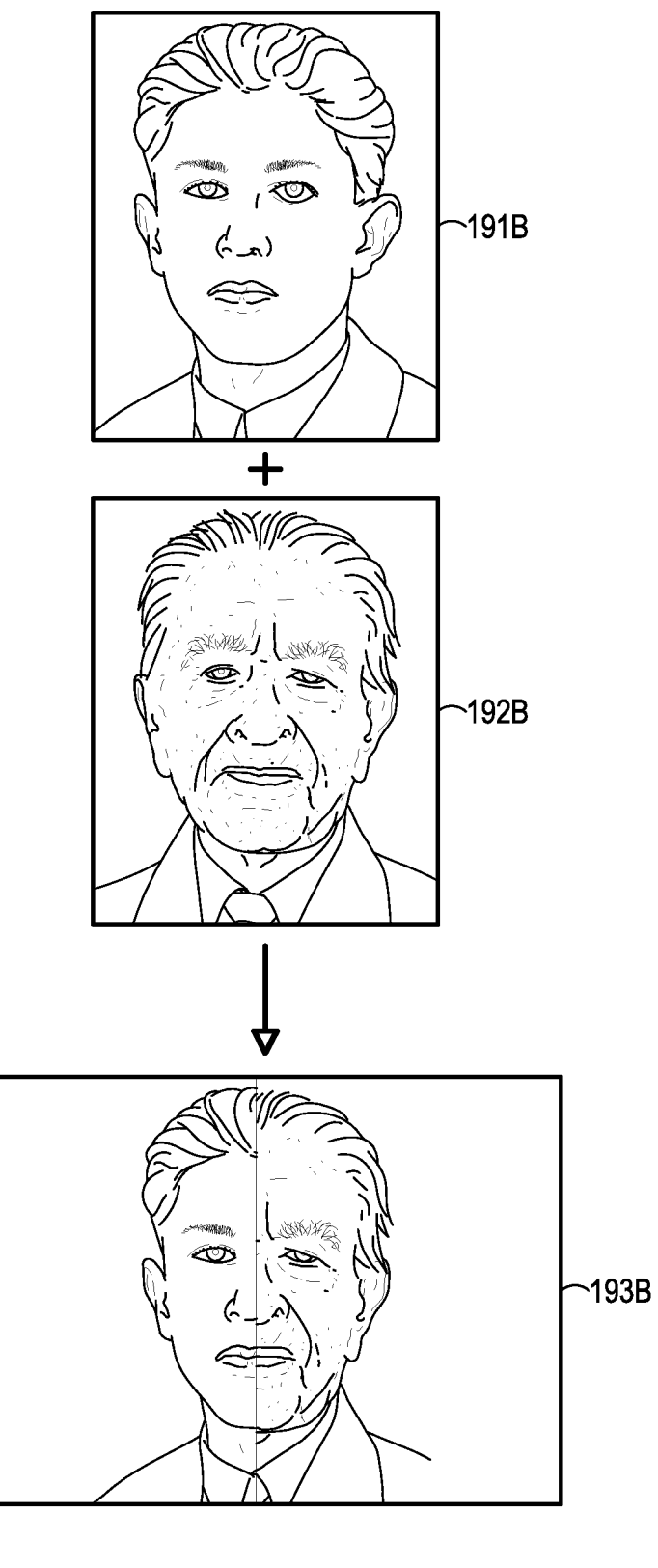
FIG. 2 a schematic view of a composite face image being created from face images of the same individual captured at different ages.

In some examples, such as shown in FIG. 2, a composite face image 193B is formed using two images 191B and 192B of the same person's face rather than face images from two separate people. For example, one face image 191B is from when a person was 20 years old while the other face image 192B is of the same person when the person was 60 years old. Images of the same person at different points in time, with different hair styles, and/or with different makeup applications, have all been observed to yield interesting composite face images.

Method Embodiment One

Figure 3:
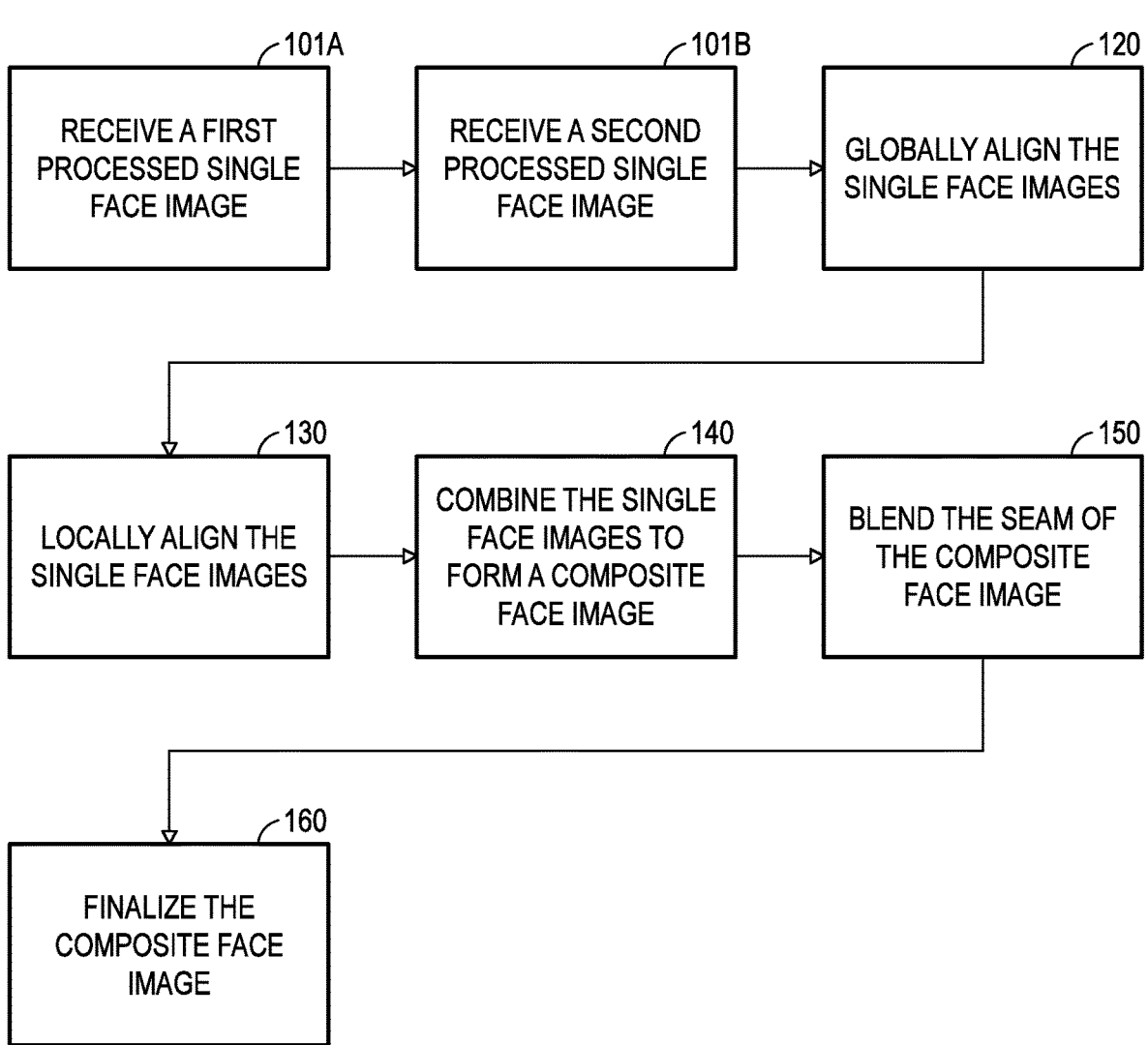
FIG. 3 a flow diagram of an automated method for forming a composite face image.

With reference to FIGS. 3-10, a first example of a method for forming composite face images with a processor executing computer executable instructions, method 100, will now be described. As shown in FIG. 3, method 100 includes multiple steps, which are listed briefly in this section and described in more detail in the sections below.

Step 101A shown in FIG. 3 involves providing a first processed single face image and step 101B involves providing a second processed single face image. At step 120, the single face images are globally aligned. At step 130, the single face images are locally aligned.

Combining the single face images to form a composite face image occurs at step 140. At step 150, the seam of the composite face image is blended. At step 160, the composite face image is finalized.

In some examples, the method does not include one or more of the steps shown in FIG. 3 for method 100. In other examples, the method includes additional or alternative steps.

Providing Processed Single Face Images

Processed single face images are provided to enable combining them into a composite face image similar to composite face images 193A and 193B depicted in FIGS. 1 and 2, respectively. As depicted in FIG. 1, the single face images may have one half of them darkened through selective photographic techniques. The methods disclosed herein do not require the single face images to have portions of them darkened, but may use images composed that way.

A processed single face image displays a single face and is sized to be appropriate for use in method 100. Further, a processed single face image has one or more geometric parameters of the face associated with the image. Method 100 utilizes the associated geometric parameters of the face images to form a composite face image.

Steps 101A and 101B involve providing processed single face images to use in subsequent steps of method 100. In some examples, already processed images are provided from the outset at steps 101A and 101B. In certain examples, an unprocessed single face image is initially provided, and the method includes processing the image to prepare it for subsequent steps in method 100.

The methods described herein may utilize width dimensions of the single face images. A width of the first face image may be described as a first face width, and a width of the second face image may be described as a second face width. The first face image and the second face image will have a vertical centerline located halfway across the horizontal width of the face images. The vertical centerlines of the face images may be described as a first face vertical centerline and a second face vertical centerline, respectively.

Another attribute of the face images that may be utilized by the methods described herein is an intrinsic axis of horizontal symmetry. An intrinsic axis of horizontal symmetry corresponds to a vertical line about which a face image is substantially symmetrical. Horizontal symmetry of a face in this document refers to symmetry between a left half of a face and a right half of face (rather than top and bottom symmetry).

The substantial qualifier for face symmetry here reflects the fact that no face is perfectly symmetrical between left and right halves; however, facial features are generally symmetrical with minor deviations from true symmetry. The intrinsic axes of horizontal symmetry of the face images may be described as a first face intrinsic axis of horizontal symmetry and a second face intrinsic axis of horizontal symmetry, respectively.

Figure 4:
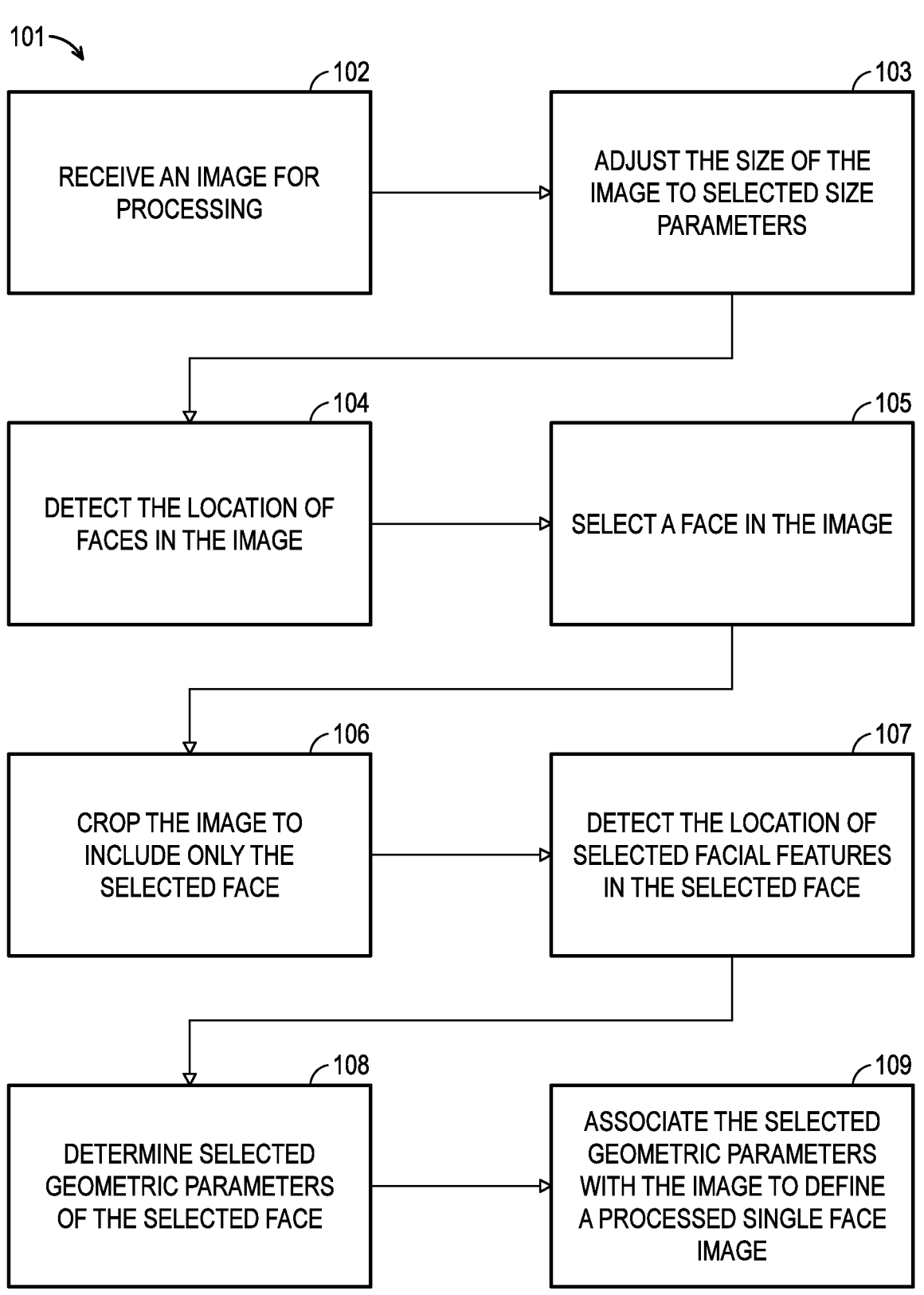
FIG. 4 is a flow diagram of a method of processing a single face image for use in the method of forming a composite face image shown in FIG. 3.

With reference to FIG. 4, the reader can see a method 101 of processing a single face image for use in method 100 shown in FIG. 3. When unprocessed images are provided initially, steps 101A and 101B shown in FIG. 3 include performing method 101 for a first face image and a second face image, respectively. As shown in FIG. 4, method 101 includes multiple steps, which are discussed in the sections below.

Receive an Image for Processing

With reference to FIG. 4, an image including a first face image is received into a memory unit for processing at step 102. The image received may include a single face or multiple faces. The image received at step 102 may be any size and resolution.

Typically, the image received will be a computer image file, such as jpeg, png, pdf, and other common image formats. In some examples, the image received is a physical photograph, and the photograph is scanned or electronically captured to yield a computer image file.

A wide variety of image subject matter is suitable for the methods described herein as long as the image subject matter includes a face. For example, the image may a portrait of a person or a candid photo of the person. Many other types of photographs, such as action photographs and headshot photographs, are suitable as well.

Adjust the Image to Selected Size Parameters

At step 103 shown in FIG. 4, the size of the image received is adjusted to selected size parameters. Working with images within selected size parameters facilitates combining face images into composite face images. In some examples, the image size is adjusted to be approximately 800 pixels tall, but any suitable picture dimensions may be used.

Adjusting the size of the image at step 103 may be accomplished by any currently known or later developed technique. One suitable technique is bicubic interpolation. Bicubic interpolation may be used to resample from a higher resolution image.

Detect the Location of Faces in the Image

Detecting the location of faces in the image at step 104 shown in FIG. 4 facilitates subsequent processing to focus the image on a face. Further, some images received at step 102 will include multiple faces and detecting the location of faces at step 104 enables limiting the image to a single face.

Any suitable means for detecting the location of faces in the image may be used for step 104. In some examples, a user is prompted to manually select faces, such as by drawing a box around the faces or clicking on faces in the image. In the present example, automated face detection algorithms are utilized to detect the location of faces at step 104.

One suitable automated face detection algorithm is based on the YOLO framework. In particular, a YOLO5Face implementation of the YOLO framework is used. The YOLO5Face algorithm adapts the YOLO architecture to detect faces and utilizes a deep neural network architecture trained on a WIDERFace dataset. One inputs an image to the YOLO5Face algorithm and it outputs an image with boxes bounding faces detected by the algorithm. Data corresponding to the location of the bounding box is associated with the output image.

Select a Face in the Image

Selecting a face in the image from the face images detected in the input image file at step 105 shown in FIG. 4 facilitates focusing the image on a selected face to be combined into a composite face image. Some images received at step 102 will include multiple faces and selecting a face in the image at step 105 enables limiting the image to a single face.

Any currently known or later developed means for selecting a face at step 105 may be utilized. For example, a user may be presented with a user interface where he or she can click a selected face with a mouse pointer or touch a selected face with a finger on a touchscreen. Additionally or alternatively, a user may be presented with a list of detected faces and the user can select one of the faces from the list. For example, the boxes bounding the faces detected in step 104 may be presented in unique colors or may be labeled with unique identifiers and a user may be presented with a list of colors or identifiers to enable selecting a desired box corresponding to a target face.

Crop the Image to Include Only the Selected Face

Cropping the image to include only the selected face at step 106 shown in FIG. 4 functions to limit the image to a single face. An image with a single face is utilized at steps 101A or 101B of method 100 shown in FIG. 3 to form a composite image of two faces. Accordingly, step 106 includes sending the cropped input image file to the memory unit to be received as the first image file.

Any currently known or later developed means for cropping the image to include only the selected face may be employed at step 106. In some examples, a user is presented with a user interface enabling him or her to draw a cropping box around the selected face and software crops the image to the area of the cropping box. In certain examples, the boxes bounding faces detected at step 104 are utilized to define the crop region of step 106. In examples where the bounding boxes define the crop region, cropping the image to include only the selected face at step 106 may occur automatically once a user selects a target face at step 105.

Detect the Location of Selected Facial Features

Detecting the location of selected facial features at step 107 shown in FIG. 4 facilitates determining geometric parameters of relevance to forming composite face images. For example, detecting the location of selected facial features at step 107 enables subsequent processing to determine an intrinsic axis of vertical symmetry of the face in the image. Detecting the location of selected facial features at step 107 also enables lining up the facial features in the composite face image.

A wide variety of facial features may be selected for having their location identified. For example, the method may include identifying the location of a person's eyes, nose, mouth, ears, and chin. In some examples, the locations of 98 distinct facial points are identified.

Any currently known or later developed means for detecting the location of selected facial features may be employed. In some examples, a user is prompted to manually click on the location of selected facial features. In the present example, an automated approach utilizing an algorithm for predicting the location of facial features is utilized.

In particular, step 107 utilizes a Practical Facial Landmark Detector (PFLD) framework to detect the location of selected facial features. In the present iteration, step 107 includes detecting the location of 98 distinct facial key points using the PFLD framework. The PFLD framework is trained on the Wider Facial Landmarks in-the-wild (WFLW) publicly available dataset to perform facial landmark detection. An image is input into the PFLD framework, the PFLD framework processes the image to detect facial feature locations, and the framework outputs data identifying the location of selected facial features.

Automated landmark prediction algorithms are imperfect, and errors can result from them. To correct errors deriving from automated facial feature prediction algorithms, some method examples include providing the user with an interface to manipulate and correct such localization errors. Once the landmarks are nudged into correct alignment, the subsequent steps of the process can proceed automatically more effectively.

Determine Selected Geometric Parameters of the Selected Face

Determining selected geometric parameters of the selected face at step 108 shown in FIG. 4 enables dividing the face image into two halves about a vertical centerline of the face (also known as an intrinsic axis of vertical symmetry). One of the face halves can then later be combined with a half face image of another face in a composite face image as part of method 100. The selected geometric parameters determined in step 108 are based on the locations of selected facial features detected in step 107.

Step 108 may start by conducting a Procrustes analysis of the face image. The Procrustes analysis determines multiple geometric attributes of a face image relevant to forming composite face images. In the present example, the Procrustes analysis determines offset or translation distance, scale change, and relative rotation change between selected facial landmark locations.

Rather than align two different faces, at this stage, the Procrustes alignment is performed on the predicted image locations for the actual facial landmarks in the image received at step 102 and on reflected or "mirrored" facial landmark locations. The reflected or mirrored facial landmark locations are locations reflected horizontally across the vertical centerline of the image from the actual facial landmark locations.

In the present example, step 108 yields three particular geometric parameters of the face in the image. Other examples may yield additional or alternative geometric parameters. A first parameter determined in step 108 is the center of the face. The center of the face may be determined by establishing the mathematical mean of the set of facial landmarks determined in step 107.

A second geometric parameter determined at step 108 is the scale of the face. The scale of the face is determined by normalizing the predicted facial landmarks based on their location relative to the center of the face. In one example, normalizing the predicted facial landmarks occurs by taking the square root of the sum of squared distances of each facial landmark location relative to the mean or center location.

A third geometric parameter determined at step 108 is the rotation angle or intrinsic axis of vertical symmetry for the face in the image. The Procrustes analysis determines the vertical axis rotation angle that best aligns the two sets of facial landmark location points. By dividing this rotation angle between the reflected point sets in half, the extent to which each of the mirrored point sets is rotated relative to vertical may be determined. The extent of rotation may then yield the intrinsic angle (the axis when taken through the center) of facial symmetry for the face.

In the present example, step 108 includes saving the determined geometric parameters into the memory unit. The geometric parameters may be saved into a geometric parameters file for later reference, such as for associating the selected geometric parameters in step 109 described below.

Associate the Selected Geometric Parameters with the Image

Associating the selected geometric parameters determined at step 108 with the image at step 109 functions to carry the geometric parameter data forward to be used with the image later in method 100. By referencing in step 109 the geometric parameter data associated with the image at step 108, method 100 can more effectively combine two face images together to form a composite face image.

Any currently known or later developed approach to associating data with an image file may be used at step 109. In some examples, the geometric parameter data is saved as metadata in the image file. Additionally or alternatively, the geometric parameter data may be saved in a data table with an identifier associated with the data. The identifier may be saved with the image file to link the image file to the data record for conventional data retrieval operations.

Globally Aligning the Single Face Images

Globally aligning orientations and sizes of the single face images at step 120 prepares the single face images to later be combined into a composite face image. The goal of global alignment at step 120 is to have both single face images at a common scale and with both face images vertically oriented. Step 120 enables the single face images to later be combined to form a composite face that is the same size on both sides of a vertical seam between the face images. Further, the single face images will be rotated to each be vertically oriented.

Additional local alignment may be performed at step 130 to refine the alignment of the single face images. For example, additional local alignment may better align facial features offset in each face image due to one face being tilted relative to the other or due to different facial feature proportions between the two faces.

Figure 5:
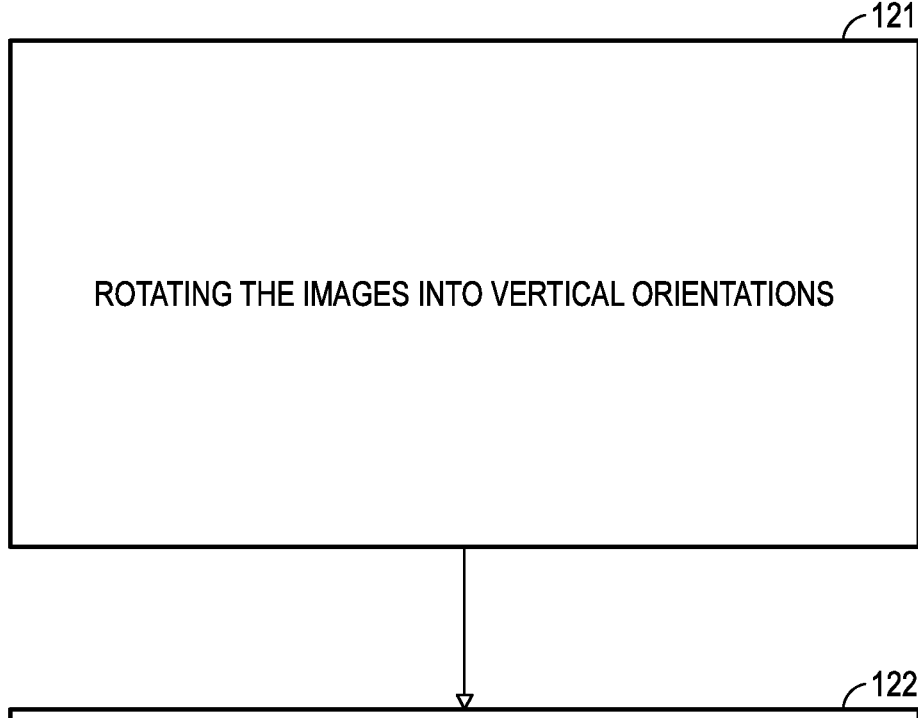
FIG. 5 is a flow diagram of method steps included in a global alignment step of the method shown in FIG. 3.

With reference to FIG. 5, global alignment at step 120 includes rotating the images into vertical orientations at step 121. Rotating the images at step 121 may include rotating the face images to orient their intrinsic axes of horizontal symmetry vertically. If the face images received into the memory unit are already oriented vertically, the global alignment step may not include rotating the face images.

The reader can further see in FIG. 5 that a sub-step 122 of global alignment step 120 is to adjust the size of the face images to be equal. Adjusting the size of the face images may involve adjusting the size of both images or a single image. If the face images received into the memory unit are already the same size and the size desired, the global alignment step may not include adjusting the size of the face images.

Depending on the order of method steps undertaken, the global alignment step may include translating the face images, such as when the face images are inserted onto a virtual canvas prior to global alignment. In some examples, global alignment includes translating the face images to align their centers (one of the selected geometric parameters that may be determined at step 108) with the center of a virtual canvas, which defines a composite image region.

After globally aligning the face images, the face images are effectively centered and made vertical. In particular, the face images are centered and vertical after global alignment independent of a head of one or both subjects in the face images being off-center or tilted in the original image.

In some examples, once the left image is centered and made vertical the location of its facial features on the composite image region are obtained and used to define the location of corresponding facial features from the right image. Alignment may include transforming the right image's predicted facial feature landmarks onto the corresponding facial feature landmarks of the left image and then aligning them. Procrustes alignment may be used to discover the translation, relative scaling, and rotation (effectively the affine transformation) needed to align the right face's predicted image locations onto the left image's (now centered and upright) landmark locations. The affine transformation that was recovered from the comparison of the left and right image's facial feature landmark locations is used to transform the right image so that it too is centered and vertical.

Locally Aligning the Single Face Images

Locally aligning the single face images at step 130 addresses alignment issues that may be present after globally aligning the single face images in step 120. Local alignment at step 130 includes vertically aligning facial features of the first face image with facial features of the second face image. Additional or alternative alignment operations may be undertaken when locally aligning the face images.

A variety of alignment issues may be present after global alignment at step 120. For example, facial features from one face may be offset from corresponding facial features in the other face. A cause of facial features of one face being offset from corresponding facial features in the other face may be one face being tilted relative to the other.

Local alignment issues may be particularly present if the individuals in the two photos are facing the camera at approximately the same head orientation with one individual having their head angled a little up and the other having their head angled a little down. In scenarios where the faces are angled differently, facial features along the seam (such as bridge of the nose, the nose, the mouth, and the chin) may not align well.

Additionally or alternatively, local alignment issues may derive from one face having different facial feature proportions or aspect ratios than the other. For example, the faces may have different vertical spacing between the eyes and nose and/or one face may be vertically shorter, but broader compared to the other face, which is relatively taller and narrower.

Local alignment at step 130 functions to refine the local alignment issues discussed above as well as other alignment issues between the single face images after they have been globally aligned in step 120. Step 130 may include one or more approaches for local alignment.

One approach utilizes landmark disparity data to refine global alignment at step 120. Because the disparity between one or more facial landmarks is known, the automated methods can be programmed to select a small set of landmarks in an area with appreciable disparities and perform local image warping. Warping is another term for adjusting an image for alignment purposes.

Preferably, both images are warped (with a thin-plate spline) so as to minimize the stretching that occurs in any given face. By selectively warping both images, each image "splits the difference" to reduce the visual impact on any one face image.

Disparity data based local alignment is generally only necessary for misaligned features along the compositing seam. Disparity based fixes also provide "correction data." The correction data resulting from disparity based alignment approaches can be used subsequently in machine learning alignment approaches discussed below.

Another approach for local alignment is based on machine learning techniques. With disparity-based correction data on hand, automated alignment methods can be programmed or trained to effectuate local alignments more effectively. For example, machine learning alignment algorithms can be programmed to recognize when misalignment is due to differences in pose and/or shape. Additionally or alternatively, the machine learning alignment algorithms can be programmed to predict the corrections most effective to use for the current pair of images. Regression analysis may be incorporated in to the machine learning algorithm programming to predict or identify the most effective alignment corrections to apply to the images.

A third approach for local alignment is based on generative adversarial techniques. Cycle-consistency and image generation via a generative adversarial network provides an additional or alternative method for locally aligning face images. Generative adversarial techniques involve taking images of two close, but differing head poses and/or faces with individual differences in shape. One pose or shape is selected as a "target" pose or shape. With the target pose or shape selected, the generative methods use a trained model to transform a differing "source" image into the "target" pose or shape.

Figure 6:
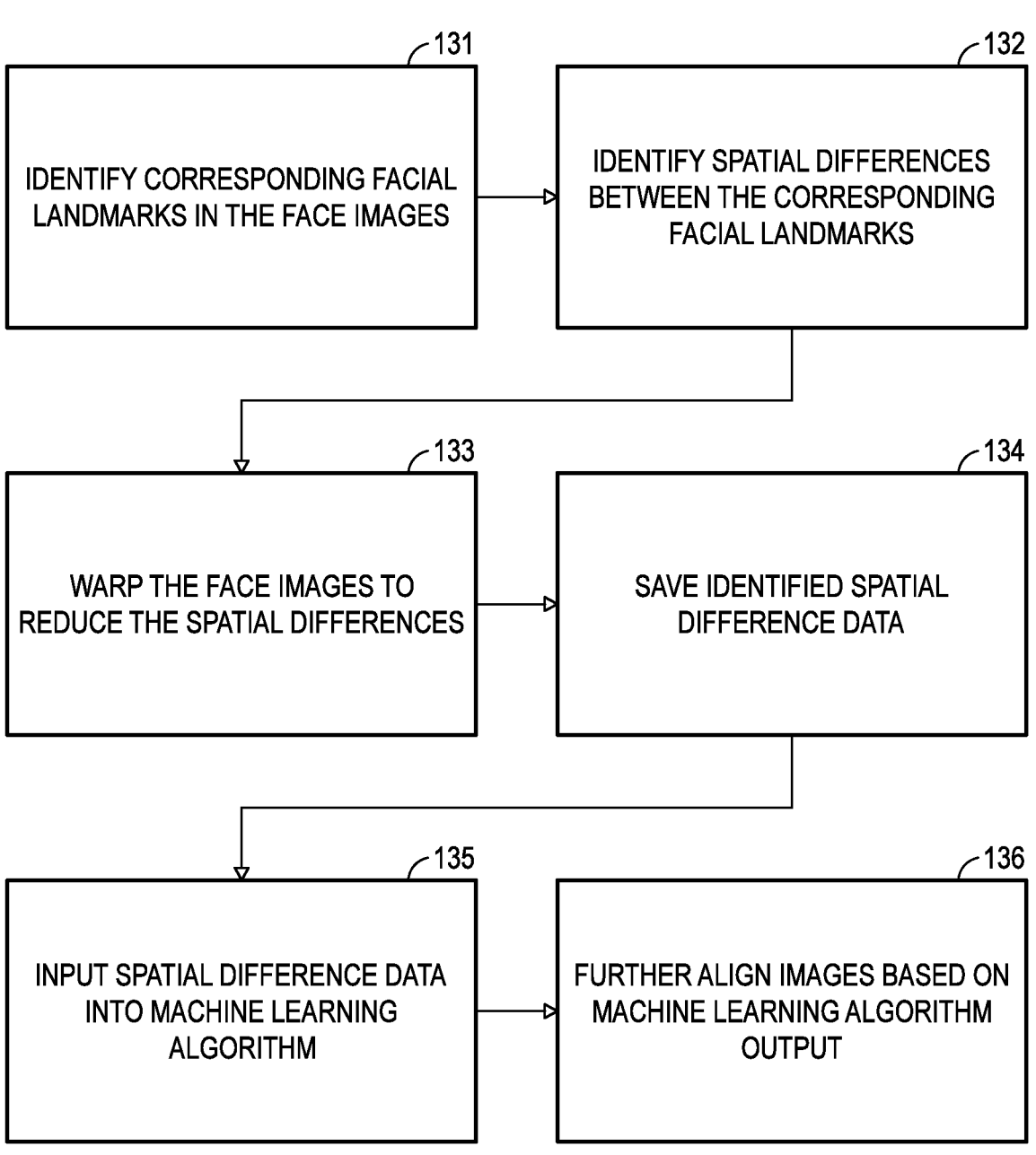
FIG. 6 is a flow diagram of method steps included in a local alignment step of the method shown in FIG. 3.

With reference to FIG. 6, a particular method of locally aligning the face images pursuant to step 130 will be described. As shown in FIG. 6, locally aligning the face images at step 130 includes identifying corresponding facial landmarks in the face images at step 131. A wide variety of facial landmarks may be used, such as the eyes, the tip of the nose, the corner of lips, tips of an ear, and other facial features.

At step 132, local alignment method 130 includes identifying spatial differences between the corresponding facial landmarks in the face images. As depicted in FIG. 6, local alignment method 130 proceeds with warping at least a portion of one or both of the first face image and the second face image at step 133. Warping the face images at step 133 functions to reduce the spatial differences between the corresponding facial landmarks identified in step 132.

Warping the face images at step 133 includes defining a warping band over the face images. In the present example, the warping band overlies the first intrinsic axis of vertical symmetry of the first face image and the second intrinsic axis of vertical symmetry of the second face image.

The warping band may include a relatively small region. For example, the warping band may encompass 2-5% of the face's area. In some examples, the warping band has a width of not more than 5% of the greater of the first face width and the second face width.

Locally aligning the face images may be limited to portions of the image within the warping band. For example, identifying spatial differences between the corresponding facial landmarks at step 132 is limited to corresponding facial landmarks within the warping band. Further, warping the face images at step 133 is limited to adjustments within the warping band. In other examples, local alignment is not confined to a defined warping band.

As shown in FIG. 6, local alignment method 130 includes saving the identified spatial differences between the corresponding facial landmarks as disparity data in a disparity data file at step 134. Local alignment method 130 includes inputting the disparity data into a machine learning algorithm at step 135. In the present example, the machine learning algorithm is programmed to further align one or more of the first face image and the second face image.

At step 136, local alignment method 130 performs subsequent alignment on one or more of the first face image and the second face image. In particular, the subsequent alignment performed at step 130 utilizes the machine learning algorithm processing the disparity data.

Figure 7:
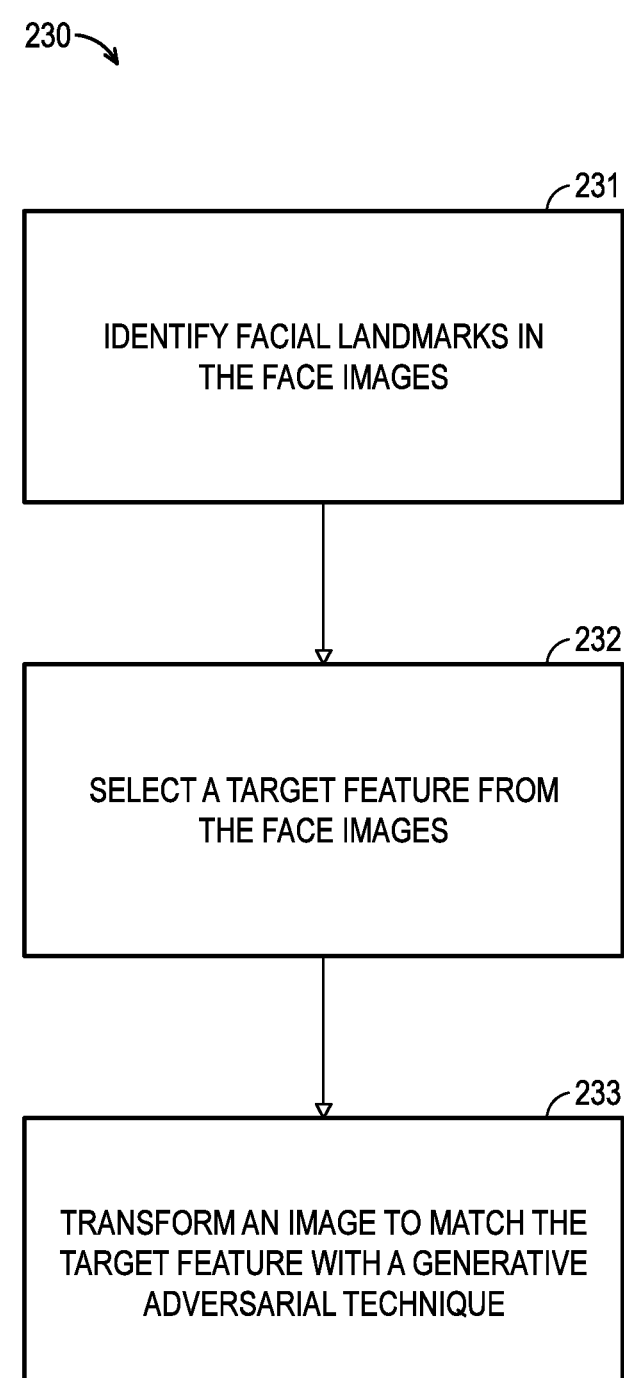
FIG. 7 is a flow diagram of additional or alternative method steps of a local alignment step.

Turning to FIG. 7, an alternative local alignment method 230 will now be described. Local alignment method 230 includes identifying spatial differences between corresponding facial landmarks in the face images at step 231. At step 232, a target feature of the first face image or the second face image is selected. In the present example, the target feature is either a pose or a shape of a face.

As shown in FIG. 7, local alignment method 230 includes transforming the first face image or the second face image to match the target feature at step 233. In particular, the face image is transformed at step 233 with a generative adversarial technique. Any currently known or later developed generative adversarial technique, including those described above, may be used at step 233.

Combining the Single Face Images

Combining the single face images at step 140 forms a composite face image with a vertical seam between the single face images. The single face images being centered, upright, and aligned from steps 120 and 130 helps make combining the single face images at step 140 more effective.

Figure 8:
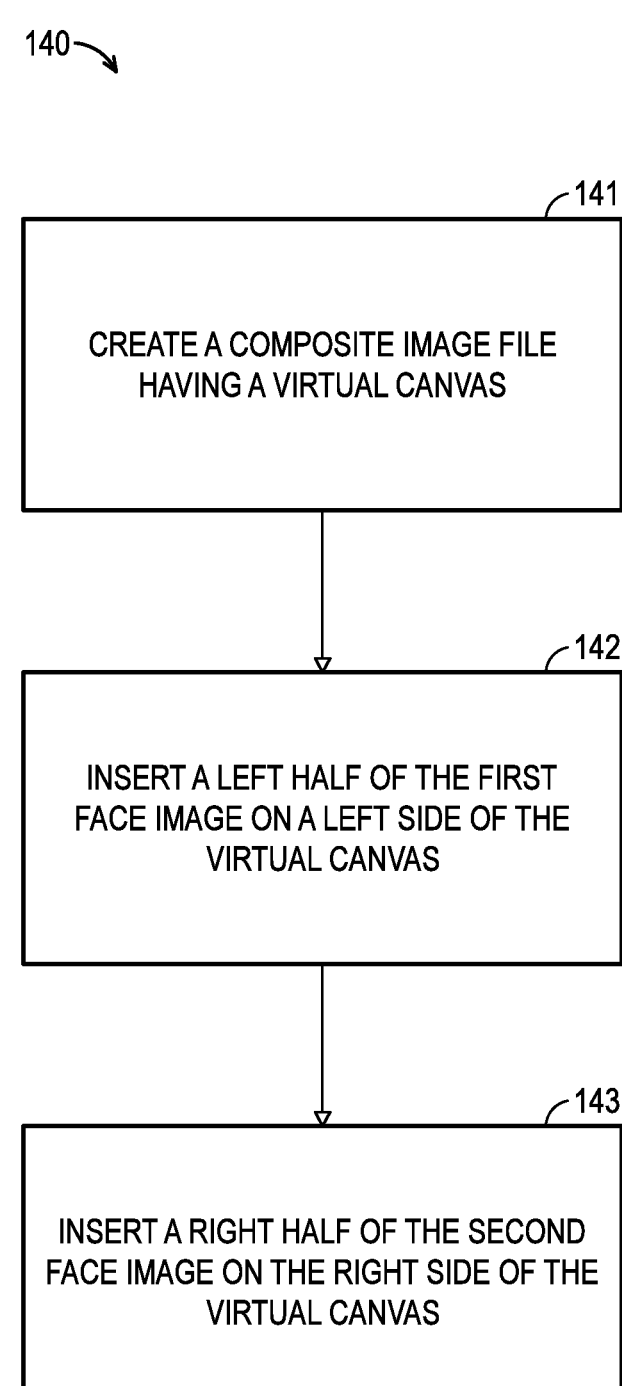
FIG. 8 is a flow diagram of method steps included in an image combination step of the method shown in FIG. 3.

As shown in FIG. 8, combining the single face images at step 140 includes creating a composite image file having a virtual canvas at step 141. The virtual canvas facilitates processing steps in method 100 for creating a composite face image. Further, the virtual canvas serves to display the composite face image.

The virtual canvas has a left side and a right side divided by a canvas vertical centerline. More specifically, the virtual canvas includes a canvas horizontal width and the canvas vertical centerline is located halfway across the canvas horizontal width. The canvas vertical centerline serves as a vertical seam between the single face images.

At steps 142 and 143 shown in FIG. 8, step 140 includes composing together a left half of the first face image on a left side of the virtual canvas with a right half of the second face image on a right side of the virtual canvas. Any currently known or later developed method for combining portions of two distinct images together may be used for step 140. In the example shown in FIG. 8, step 142 is to insert a left half of the first face image on a left side of the virtual canvas. At step 143, the second face image is inserted adjacent to and aligned with the left half of the first face image.

Figure 9:
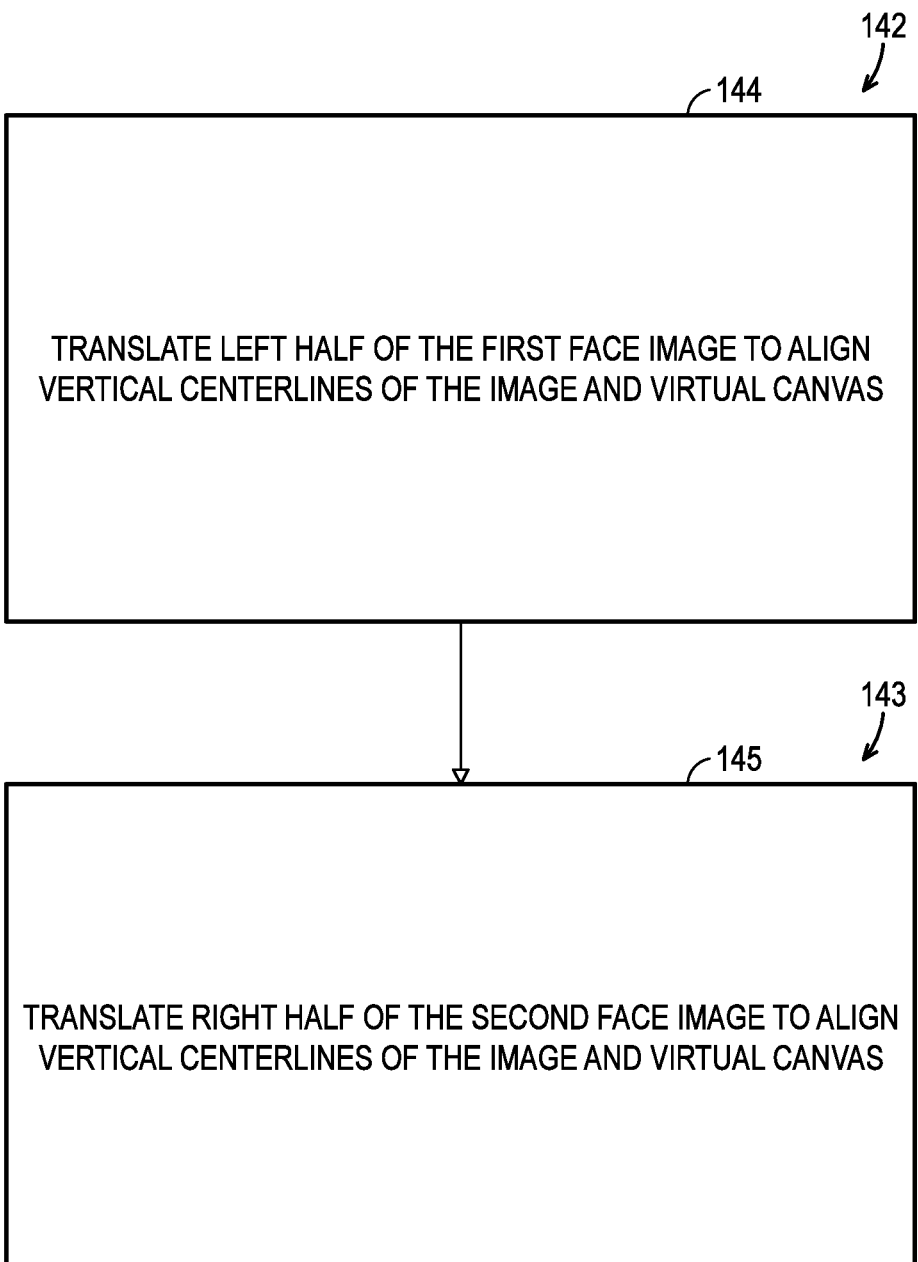
FIG. 9 is a flow diagram of method steps included in image insertion steps of the image combination step shown in FIG. 8.

As shown in FIG. 9, inserting the left half of the first face image at step 142 includes translating the left half of the first face image at step 144. The left half of the first face image is translated at step 144 until vertical centerlines of the first face image and the virtual canvas are aligned.

As further shown in FIG. 9, inserting the right half of the second face image at step 143 includes translating the right half of the second face image at step 145. The right half of the second face image is translated at step 145 until vertical centerlines of the second face image and the virtual canvas are aligned.

The face images are adjacent to each other about a seam between the left half of the first face image and the right half of the second face image. The seam corresponds with the vertical centerline of the virtual canvas.

Blending the Seam of the Composite Face Image

The seam formed from combining the single face images at step 140 can be visually apparent, which may or may not be desired. For example, composite face images 193A and 193B depict a hard seam between the face images. A soft seam would be nearly visually imperceptible.

Blending the seam at step 150 functions to reduce how visually apparent the seam is in the composite face image. Step 150 is optional and may not be utilized in all method examples because the seam may not be visually apparent in some examples and/or it may be desired to have the seam more visually apparent. In instances where a hard seam is desired, steps to blend the seam will not be undertaken or will be more minimally undertaken than when a soft seam is desired.

Blending the seam at step 150 may be referred to as feathering the seam and may include multiple steps. In one example, a vertical band or region is chosen along the vertically oriented boundary between the two images. The height of the band may be the full image height. The width of the band may be 20% of the width of the left detected face box. Other width amounts may be used instead, but 20% has been observed to work well.

The width of the band may be allocated equally on each side of the vertical seam boundary. In examples where the band width is 20%, 10% of the band may extend to the left of the seam and 10% may extend to the right of the seam.

The reason why the left face is used as a reference for setting the band width is that the scale of the left image is not adjusted in earlier processing steps like may occur with the right image. The size of the left image is deemed to be the standard size to which the right image is comparatively scaled to match. Designating the left image as the standard is arbitrary and the right image could be set as the standard size in other examples.

Figure 10:
FIG. 10 is a flow diagram of a method step included in seam blending step of the method shown in FIG. 3.
Figure 10:
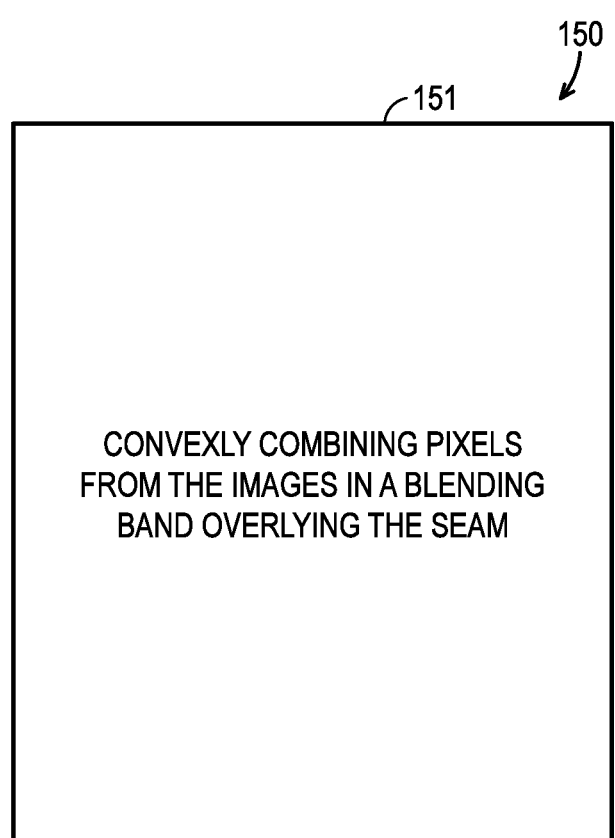

In some examples, as shown in FIG. 10, blending the seam at step 150 includes convexly combining the pixels in the two (left and right) columns of the band at step 151. In other less preferred examples, the pixels of one column are simply copied to the other corresponding column. Convexly combining the pixels in the two columns of the band has been observed to yield more visually appealing blends of the images.

To convexly combine the pixels, weights may first be determined for the corresponding column of the left image and the corresponding column of the right image. The weights help make a smooth transition along the seam while also tapering the image manipulation away from the seam. Tapering how much the images are manipulated distal the seam helps to blend the face images outside the band with the images within the band. Expressed another way, the weighting causes the blending to be most pronounced close to the seam and less pronounced in the band farther away from the seam and closer to the unblended image portions.

The weights are effectively percentages. For example, a weight of 0.32 means 32% of the pixels from a column will be copied and replace corresponding pixels from the opposite column and vice versa. The left and right weights will sum to 1.00 (100%). For instance, in the 0.32 example, 32% of the pixels from the left column will be replaced by corresponding pixels from the right column and 68% of the pixels from the left column will remain unmodified.

The weights may be determined by a variety of methods. One weighting method includes calculating a linear ramp. For example, if the band is going to be n pixels wide (n will typically be an even number), a linear ramp may be calculated from 0.0 up to 1.0. For example, if n=10, the ramp would be [0.0, 0.111, 0.222, ... 0.777, 0.888, 1.0]. The linear ramp effectively identifies what fraction of the way from left to right you are at in that column.

If the ramp is denoted by the variable P, the following equation can be used to determine the weights (percentages) that should be used in generating the i-th column of the band for the left weights: $Li=P[i]2/(P[i]2+(1-P[i])2)$. Column i of the band is determined using the convex combination Li* (i-th column of the left image)+(1−Li)*(i-th column of the right image). The equation (1−Li) may be used to determine the right weight.

Once the band is calculated as described above, the band is used in the center of the final composite image. The columns to the left of the band come exclusively from the centered upright left image. The columns to the right of the band come from the transformed right image.

Finalizing the Composite Face Image

Finalizing the composite face image at step 160 allows for adjusting the scale and resolution of the composite image. In some examples, the process described above through step 150 produces a merged version of the 800-pixel working images. The calculated transformations can be adjusted in scale to handle higher-resolution original images. Similarly, the local warping and seam smoothing operations can be done at full resolution; thus, producing a full resolution composited image. Additionally or alternatively, any currently known or later developed technique for adjusting the scale or resolution of an image may be employed to yield a composite image of a desired size and resolution.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A method for forming a composite face image with a processor executing computer executable instructions, the method comprising the steps of:

receiving into a memory unit a first image file including a first face image;

receiving into the memory unit a second image file including a second face image;

globally aligning orientations and sizes of the first face image and the second face image;

locally aligning the first face image with the second face image to vertically align facial features of the first face image with facial features of the second face image;

creating a composite image file having a virtual canvas for depicting the composite face image;

inserting a left half of the first face image on a left side of the virtual canvas; and inserting a right half of the second face image on a right side of the virtual canvas adjacent to and aligned with the left half of the first face image about a seam between the left half of the first face image and the right half of the second face image;

wherein locally aligning the first face image with the second face image includes:

identifying corresponding facial landmarks in the first face image and in second face image;

identifying spatial differences between the corresponding facial landmarks in the first face image and in the second face image; and warping at least a portion of one or both of the first face image and the second face image to reduce the spatial differences between the corresponding facial landmarks.

2. The method of claim 1, wherein:

the second face image depicted in the second image file is of the same person as the first face image depicted in the first image file; and the second face image depicted in the second image file captures the same person at a different age than the same person was in the first face image.

3. The method of claim 1, wherein globally aligning orientations and sizes of the first face image and the second face image includes rotating, if necessary, one or both of the first face image and the second face image into vertical orientations.

4. The method of claim 3, wherein:

the first face image has a first intrinsic axis of horizontal symmetry about which the first face image is substantially symmetrical;

the second face image has a second intrinsic axis of horizontal symmetry about which the second face image is substantially symmetrical; and globally aligning orientations and sizes of the first face image and the second face image includes rotating one or both of the first face image and the second face image, if necessary, until the first intrinsic axis of horizontal symmetry and the second intrinsic axis of horizontal symmetry are oriented vertically.

5. The method of claim 1, wherein globally aligning orientations and sizes of the first face image and the second face image includes adjusting to a common size the size of one or both of the first face image and the second face image, if necessary.

6. The method of claim 1, wherein:

the virtual canvas includes a canvas horizontal width;

the virtual canvas has a canvas vertical centerline located halfway across the canvas horizontal width;

the first face image has a first face width;

the first face image has a first face vertical centerline located halfway across the first face horizontal width; and inserting the left half of the first face image includes translating the left half of the first face image on the virtual canvas to a position where the first face vertical centerline is aligned with the canvas vertical centerline.

7. The method of claim 6, wherein:

the second face image has a second face width;

the second face image has a second face vertical centerline disposed halfway across the second face horizontal width; and inserting the right half of the second face image includes translating the right half of the second face image on the virtual canvas to a position where the second face vertical centerline is aligned with the canvas vertical centerline.

8. The method of claim 1, wherein:

the first face image has a first face width and a first intrinsic axis of horizontal symmetry about which the first face image is substantially symmetrical;

the second face image has a second face width and a second intrinsic axis of horizontal symmetry about which the second face image is substantially symmetrical;

a warping band is defined as overlying the first intrinsic axis of vertical symmetry and the second intrinsic axis of vertical symmetry with a width of not more than 5% of the greater of the first face width and the second face width; and identifying spatial differences between the corresponding facial landmarks is limited to corresponding facial landmarks within the warping band.

9. The method of claim 1, wherein both the first face image and the second face image are warped to reduce the visual impact of warping the first face image and the second face image.

10. The method of claim 1, wherein locally aligning the first face image with the second face image includes:

saving the identified spatial differences between the corresponding facial landmarks as disparity data in a disparity data file;

inputting the disparity data into a machine learning algorithm programmed to further align one or more of the first face image and the second face image; and performing subsequent alignment on one or more of the first face image and the second face image with the machine learning algorithm utilizing the disparity data.

11. The method of claim 1, further comprising blending the seam in the composite face image to render the seam less visually apparent.

12. The method of claim 11, wherein blending the seam includes convexly combining pixels from the left half of the first face image and the right half of the second face image within a blending band overlying the seam.

13. The method of claim 12, wherein:

the left half of the first face image has a left half image width; and the blending band has a blending band width that is 20% or less than the left half image width.

14. The method of claim 13, wherein the blending band extends over portions of both the left half of the first face image and the right half of the second face image.

15. The method of claim 1, further comprising adjusting the scale of the composite face image.

16. The method of claim 1, further comprising adjusting the resolution of the composite face image.

17. A method for forming a composite face image with a processor executing computer executable instructions, the method comprising the steps of:

receiving into a memory unit a first image file including a first face image;

receiving into the memory unit a second image file including a second face image;

globally aligning orientations and sizes of the first face image and the second face image;

locally aligning the first face image with the second face image to vertically align facial features of the first face image with facial features of the second face image;

creating a composite image file having a virtual canvas for depicting the composite face image;

inserting a left half of the first face image on a left side of the virtual canvas; and inserting a right half of the second face image on a right side of the virtual canvas adjacent to and aligned with the left half of the first face image about a seam between the left half of the first face image and the right half of the second face image;

wherein locally aligning the first face image with the second face image includes:

selecting a target feature of one of the first face image and the second face image, wherein the target feature is either a pose or a shape of a face; and transforming the first face image or the second face image with a generative adversarial technique to match the target feature.

18. A method for forming a composite face image with a processor executing computer executable instructions, the method comprising the steps of:

receiving into a memory unit a first image file including a first face image;

receiving into the memory unit a second image file including a second face image;

globally aligning orientations and sizes of the first face image and the second face image;

locally aligning the first face image with the second face image to vertically align facial features of the first face image with facial features of the second face image;

creating a composite image file having a virtual canvas for depicting the composite face image;

inserting a left half of the first face image on a left side of the virtual canvas;

inserting a right half of the second face image on a right side of the virtual canvas adjacent to and aligned with the left half of the first face image about a seam between the left half of the first face image and the right half of the second face image;

receiving into the memory unit an input image file;

detecting the location of face images in the input image file;

selecting a selected face image from the face images detected in the input image file;

cropping the input image file to include only the selected face image;

sending the cropped input image file to the memory unit to be received as the first image file;

detecting the locations of selected facial features in the selected face image;

determining selected geometric parameters of the selected face image based on the detected locations of selected facial features;

saving a geometric parameters file including the determined geometric parameters into the memory unit; and associating the geometric parameters file with the first image file received in the memory unit.

* * * * *